United States Patent [19]

Tachibana et al.

[11] Patent Number: 5,115,323
[45] Date of Patent: May 19, 1992

[54] VIDEO DISC APPARATUS RECORDING TIME-EXPANDED LUINANCE SIGNALS AND TIME-COMPRESSED CHROMINANCE SIGNALS

[75] Inventors: Kaoru Tachibana; Ken Morita; Hiroo Takahashi, all of Kanagawa, Japan

[73] Assignee: Sony Corporation, Tokyo, Japan

[21] Appl. No.: 413,064

[22] Filed: Sep. 27, 1989

[30] Foreign Application Priority Data

Oct. 12, 1988 [JP] Japan .................................. 63-256682

[51] Int. Cl.$^5$ .............................................. H04N 11/02
[52] U.S. Cl. ..................... 358/330; 358/310; 358/11
[58] Field of Search ................. 358/330, 310, 11, 12

[56] References Cited

U.S. PATENT DOCUMENTS 4,567,508  1/1986  Hulyer ................................. 358/12
4,605,950  8/1986  Goldberg et al. .................... 358/12

FOREIGN PATENT DOCUMENTS 60-208191  10/1985  Japan ................................. 358/12

OTHER PUBLICATIONS

Translation of Foreign patent 60208191.

Primary Examiner—Roy N. Envall, Jr.
Assistant Examiner—Khoi Truong
Attorney, Agent, or Firm—Alvin Sinderbrand; William S. Frommer

[57] ABSTRACT

A wide bandwidth color video signal, such as a high definition television (HDTV) signal is recorded on a video disc by timebase expanding the luminance component and timebase compressing the color difference components to a bandwidth substantially equal to the bandwidth of the timebase expanded luminance component. The timebase expanded luminance component and the timebase compressed color difference components are time division multiplexed and separated into plural channels of multiplexed signals, each of which is recorded in a respective track on the video disc. Signals recorded in this format are recovered by reproducing the plural channels of multiplexed luminance and color difference components from respective tracks, demultiplexing the timebase expanded luminance component and the timebase compressed color difference components, timebase compressing the separated luminance component to return it to its conventional timebase, and timebase expanding the separated color difference components to return them to their conventional time base.

24 Claims, 3 Drawing Sheets

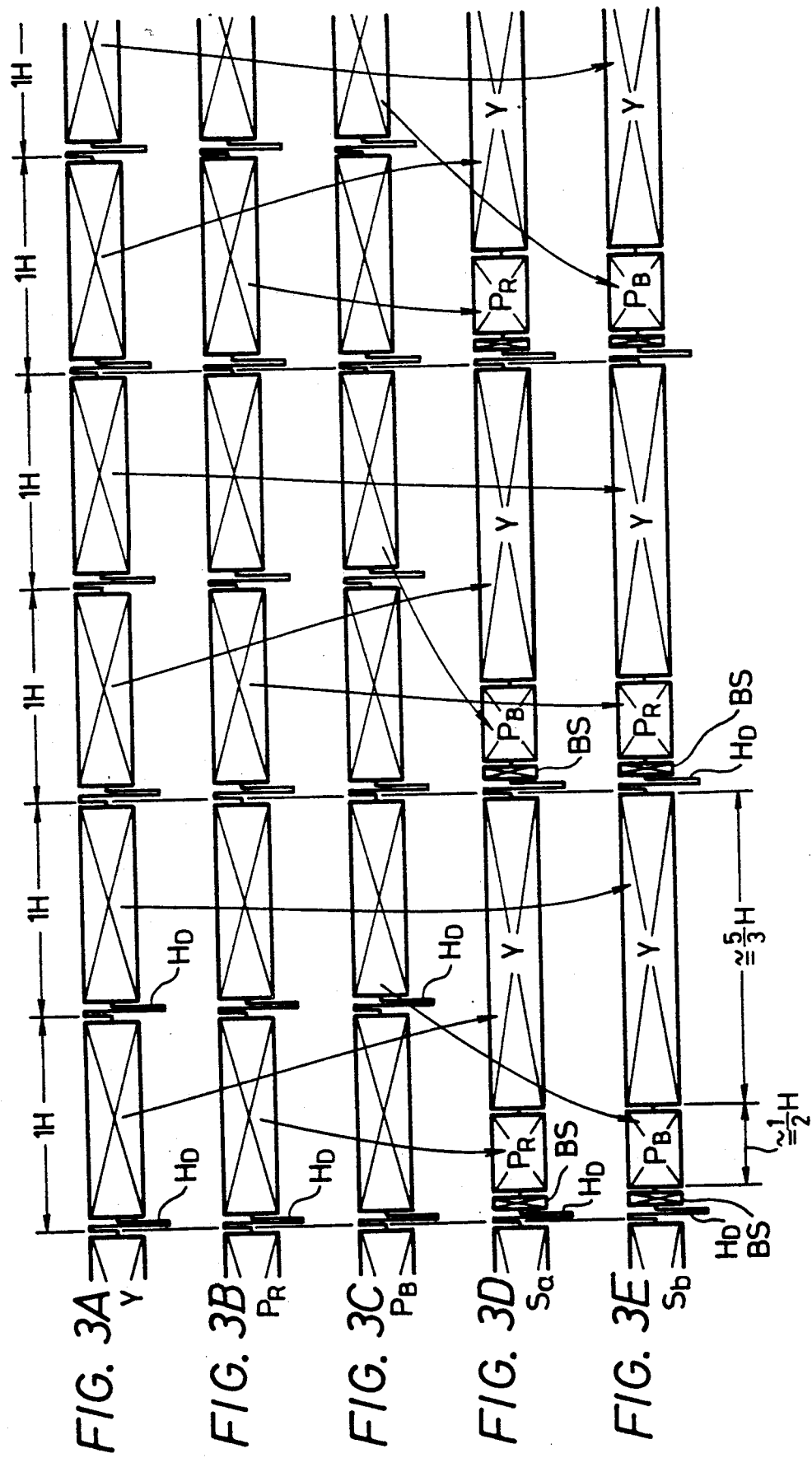

VIDEO DISC APPARATUS RECORDING TIME-EXPANDED LUINANCE SIGNALS AND TIME-COMPRESSED CHROMINANCE SIGNALS

BACKGROUND OF THE INVENTION

1. Field of the Invention

This invention relates to recording and reproducing techniques for use with information signals having a wide bandwidth and, more particularly, to such techniques whereby a wide bandwidth color video signal may be recorded on a video disc by timebase expanding the luminance component and timebase compressing the color difference components prior to recording.

2. Description of the Prior Art

Composite color video signals used in high definition television transmission (HDTV) exhibit a wider bandwidth than conventional non-HDTV signals. For example, the bandwidth of the HDTV luminance component is on the order of about 20 MHz and the bandwidth of the HDTV red and blue color difference signals each is on the order of about 6 MHz. See, for example, Japanese Laid-Open Patent Document No. 58-38091.

It is expected that HDTV displays will be produced not only from broadcast HDTV signals, such as over-the-air or cable distribution transmission, but also from prerecorded television programs, such as prerecorded HDTV video discs. Because of the wide bandwidth of HDTV composite signals, satisfactory reproduction and display of an HDTV picture may require that the rotational speed of the video disc be relatively high, the track pitch in which successive tracks are recorded be reduced, and the wavelength of the light beam, such as the laser beam used to record the video signals, also should be reduced. At the present time, it is believed that some or all of these requirements still are under development. Hence, it is anticipated that substantial efforts and expense still may be needed to develop a commercially acceptable system in which the video disc is rotated at the proper speed, the track pitch is sufficiently fine and the wavelength of the recording laser beam is sufficiently low.

An alternative to recording a wide bandwidth HDTV signal contemplates a reduction in that bandwidth. Band compressing techniques are known, and it is thought that such techniques can be used to suitably reduce the bandwidth of the television signal for recording in accordance with conventional video recording techniques. However, depending upon the program content of the video signals, it has been observed that the use of band compression results in a television picture that is not natural looking. Furthermore, band compression circuitry used for wide band video signals are relatively complex.

OBJECTS AND SUMMARY OF THE INVENTION

Therefore, it is an object of the present invention to provide improved techniques for recording a wide bandwidth video signal on a video disc that avoids the aforenoted drawbacks and disadvantages.

Another object of this invention is to provide a technique for recording a wide bandwidth video signal on a video disc which does not require the use of complex circuitry nor does it depend upon the development of future technology.

A further object of this invention is to provide techniques for recording on and reproducing from a video disc which are readily applicable to HDTV signals.

An additional object of this invention is to provide an improved technique by which individual components included in a wide bandwidth composite color video signal are separately processed for recording.

Yet another object of this invention is to provide a technique as aforementioned, wherein the individual components are timebase compressed or timebase expanded to reduce the overall bandwidth of the recorded video signal.

Various other objects, advantages and features of the present invention will become readily apparent from the ensuing detailed description, and the novel features will be particularly pointed out in the appended claims.

In accordance with this invention, a composite color video signal having a wide bandwidth is recorded on a video disc by timebase expanding the luminance component of that video signal, timebase compressing the color difference components to a bandwidth substantially equal to the bandwidth of the timebase expanded luminance component, time division multiplexing the expanded luminance component and the compressed color difference components and separating the multiplexed components into plural channels, and recording the separate channels of multiplexed components in separate tracks on a video disc.

In one application of this invention, the wide bandwidth video signal is an HDTV signal, and the luminance component is timebase expanded by a factor of approximately 5/3 while the color difference components are timebase compressed by a factor of approximately ½.

As one aspect of this invention, the color difference components are formed of first and second color difference components (such as red and blue color difference signals); and the timebase expanded luminance component of every other horizontal line interval is multiplexed with one and then the other of the timebase compressed color difference components (e. g. the red color difference component and then the blue color difference component) to form a first channel of multiplexed signals, and the timebase expanded luminance component of the remaining horizontal line intervals is multiplexed with the other and then the one of the timebase compressed color difference components (e. g. the blue color difference component and then the red color difference component) to form a second channel of multiplexed signals.

Stated otherwise, in accordance with an aspect of this invention, a first channel is formed by multiplexing the timebase expanded luminance component of an $(n+4x)$th line interval with the timebase compressed first color difference component of the $(n+4x)$th line interval followed by multiplexing the timebase expanded luminance component of the $(n+4x+2)$th line interval with the timebase compressed second color difference component of the $(n+4x+3)$th line interval, wherein n is any line interval and $x=0, 1, 2\ldots$; and wherein the second channel is formed by multiplexing the timebase expanded luminance component of the $(n+4x+1)$th line interval with the timebase compressed second color difference component of the $(n+4x+1)$th line interval followed by multiplexing the timebase expanded luminance component of the $(n+4x+3)$th line interval with the timebase compressed first color difference component of the $(n+4x+2)$th line interval.

As another feature of this invention, the multiplexed timebase expanded and timebase compressed components recorded in separate channels are reproduced, and the timebase expanded luminance component and timebase compressed color difference components are demultiplexed to derive separate timebase modified luminance and color difference components. The separated luminance component is timebase compressed to return it to its conventional timebase and, likewise, the separated color difference components are timebase expanded to return them to their conventional timebase. The timebase compression carried out during the reproducing operation is complementary to the timebase expansion carried out during recording and, likewise, the timebase expansion carried out during the reproducing operation is complementary to the timebase compression carried out during recording.

As an aspect of the reproducing operation, successive line intervals of the timebase expanded luminance component reproduced from the video disc are recovered from alternate ones of the reproduced first and second channels; and the (n+4x) and (n+4x+2) line intervals of the timebase compressed first color difference component are recovered in succession from alternate ones of the reproduced first and second channels, while the (n+4x+1) and the (n+4x+3) line intervals of the timebase compressed second color difference component are recovered in succession from alternate ones of the reproduced second and first channels.

BRIEF DESCRIPTION OF THE DRAWINGS

The following detailed description, given by way of example, and not intended to limit the present invention solely thereto, will best be understood in conjunction with the accompanying drawings in which:

FIGS. 3A—3E are waveform diagrams which are useful in understanding the operation of the present invention.

DETAILED DESCRIPTION OF CERTAIN PREFERRED EMBODIMENTS

Figure 1:
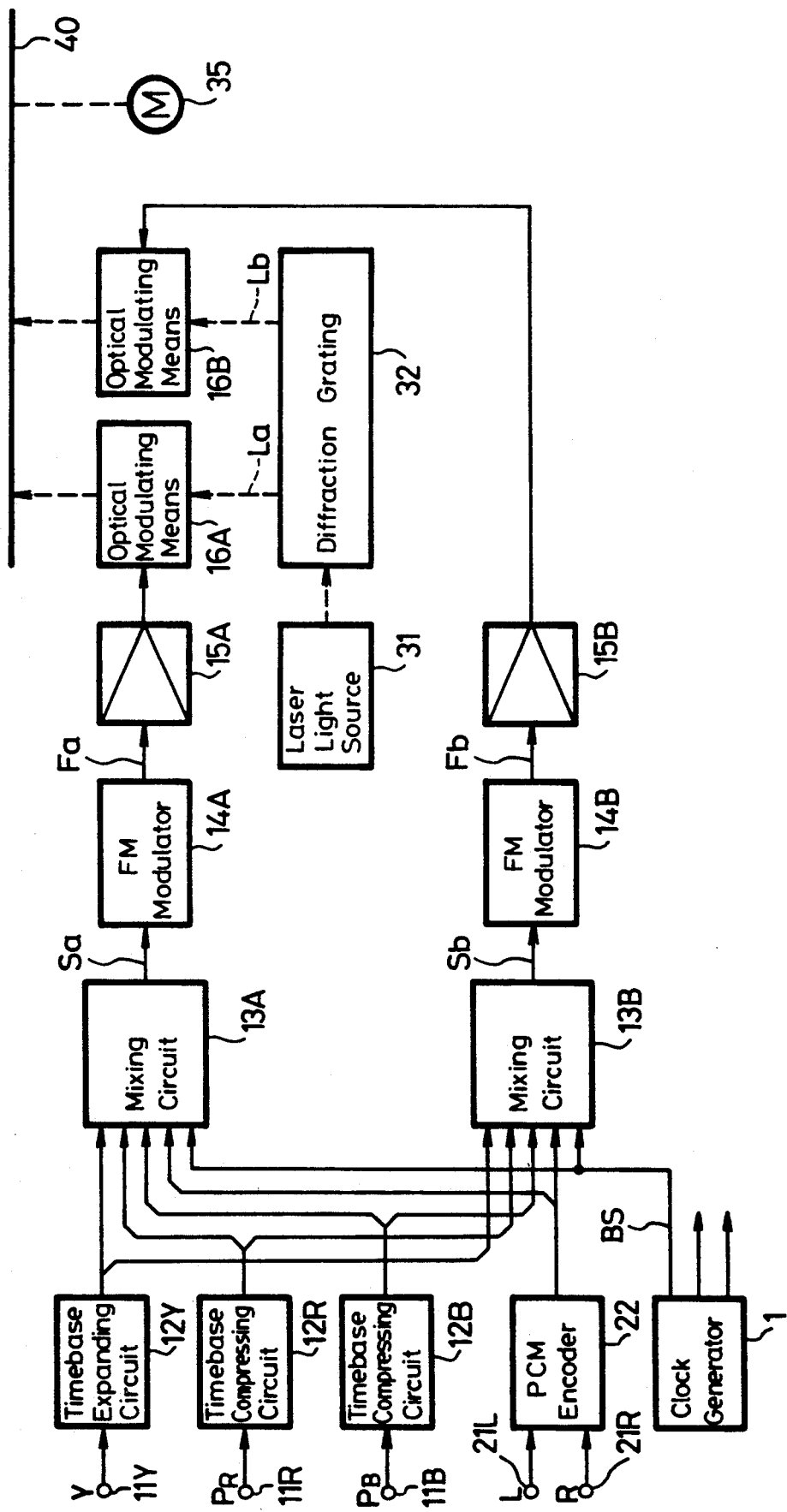
FIG. 1 is a block diagram of recording apparatus which incorporates the present invention to record a wide bandwidth video signal onto a video disc.

Referring to FIG. 1, there is illustrated an embodiment of video signal recording apparatus by which a wide band composite color video signal, such as an HDTV signal, is recorded on a video disc. For purposes of the present discussion, it is assumed that video signal processing circuitry known to those of ordinary skill in the art operate to separate the composite color video signal into its luminance component Y and into two color difference components such as the red color difference component $P_R$ and the blue color difference component $P_B$. The red color difference component may be the well-known (R-Y) signal and the blue color difference component may be the well-known (B-Y) signal. Alternatively, the color difference signal may be represented as (G-R) and (G-B) signals, wherein R, G and B are the usual red, green and blue primary color signals.

With the foregoing understanding, the apparatus illustrated in FIG. 1 is comprised of a timebase expanding circuit 12Y, timebase compressing circuits 12R and 12B, mixing circuits 13A and 13B and optical recording circuitry, including optical modulators 16A and 16B. Timebase expanding circuit 12Y is coupled to an input terminal 11Y to receive the separated luminance component Y. It is assumed, for the purpose of the present description, that the luminance component exhibits a bandwidth on the order of 20 MHz. Timebase compressing circuit 12R is coupled to an input terminal 11R to receive color difference component $P_R$. Likewise, timebase compressing circuit 12B is coupled to an input terminal 11B to receive color difference component $P_B$. The color difference components are assumed to exhibit bandwidths on the order of about 6 MHz.

The output of timebase expanding circuit 12Y is coupled to mixing circuits 13A and 13B, as are the outputs of timebase compressing circuit 12R and timebase compressing circuit 12B. The timebase expanding circuit is adapted to expand the time duration of the luminance component supplied thereto and, as an example, may be comprised of a memory device whose read-out rate is less than its write-in rate, thereby expanding the effective time duration of the luminance component. Conversely, each of timebase compressing circuits 12R and 12B is adapted to reduce the time duration of the color difference component supplied thereto and, as an example, may be comprised of a memory device whose read-out rate is greater than its write-in rate.

Mixing circuits 13A and 13B are adapted to time division multiplex the luminance and color difference components supplied thereto. In addition to these video components, the mixing circuits are supplied with digitized audio signals produced a PCM encoder 22 in response to left-channel and right-channel audio signals supplied to input terminals 21L and 21R, respectively. For example, the left-channel and right-channel audio signals may be sampled by PCM encoder 22 at a rate on the order of about 48 KHz, with each sample converted to a 16-bit character. Error correction data is added to the digitized audio samples; and the resultant PCM encoded signals are timebase compressed and supplied to mixing circuits 13A and 13B to be inserted into the vertical blanking interval of the timebase modified luminance and color difference components.

Still further, mixing circuits 13A and 13B are coupled to a clock generator 1 which is adapted to generate various clock signals used for synchronization and processing of the multiplexed video and audio signals in a manner known to those of ordinary skill in the art. Clock generator 1 also generates a color burst signal BS that is supplied to mixing circuits 13A and 13B for insertion into the multiplexed video and audio signals, to be described.

Mixing circuits 13A and 13B are included in separate channels which, for convenience, are referred to herein simply as channel A and channel B. Each channel is comprised of substantially the same signal processing circuitry, and such circuitry is distinguished by the suffix A or B, respectively, to identify its channel. Thus, in channel A, mixing circuit 13A is coupled to an FM modulator 14A which functions to frequency modulate the multiplexed video and audio components, and the output of FM modulator 14A is coupled to optical modulator 16A by way of an amplifier 15A. Likewise, in channel B, mixing circuit 13B is coupled to an FM modulator 14B whose frequency modulated output is coupled to optical modulator 16B by way of an amplifier 15B. The frequency modulated signals supplied to optical modulators 16A and 16B are adapted to frequency modulate respective laser beams $L_a$ and $L_b$ derived from a laser source 31. A diffraction grating 32 serves to separate the laser beam generated by source 31 into two separate laser beams $L_a$ and $L_b$, respectively. These beams, as modulated by optical modulators 16A and 16B, impinge upon master video disc 40 which is rotatably driven by a suitable motor 35. In one embodiment, disc 40 is rotated at the rate of 60 rotations per second which, it is appreciated, is the video field frequency of the NTSE system. As motor 35 rotates disc 40, suitable means (not shown) drives optical modulators 16A and 16B in the radial direction such that channels A and B are recorded concurrently as two spiral tracks on the master disc.

The manner in which the luminance and color difference components are timebase processed and multiplexed into channels A and B now will be described with reference to the waveforms shown in FIGS. 3A-3E. FIG. 3A represents successive horizontal line intervals 1H of the luminance component Y. As shown, each horizontal line interval is preceded by the usual horizontal synchronizing signal $H_D$. Likewise, FIG. 3B represents successive horizontal line intervals of the red color difference component $P_R$; and FIG. 3C represents successive horizontal line intervals of the blue color difference component $P_B$. These respective luminance and color difference components in successive, conventional line intervals are supplied to timebase expanding circuit 12Y, timebase compressing circuit 12R and timebase compressing circuit 12B, respectively.

Timebase expanding circuit 12Y functions to expand the timebase of successive line intervals of the luminance component by the factor 5/3. Thus, each conventional line interval of the luminance component Y is expanded to encompass an interval approximately equal to $_3^5$ H.

Timebase compressing circuit 12R functions to timebase compress alternate line intervals of the red color difference component $P_R$. Each alternate line interval thus is compressed into an interval approximately equal to $\frac{1}{2}$ H. For example, each odd line interval of the red color difference component is so compressed.

In a similar manner, timebase compressing circuit 12B functions to timebase compress alternate line intervals of the blue color difference component $P_B$. For example, each even line interval of the blue color difference component is timebase compressed to an interval approximately equal to one-half a conventional line interval.

Thus, mutually exclusive, alternative line intervals of the color difference components are timebase compressed, whereas every line interval of the luminance component is timebase expanded. In one embodiment, the timebase expanded luminance component is supplied alternately to mixing circuit 13A and then to mixing circuit 13B. For example, mixing circuit 13A may be supplied with the timebase expanded luminance components derived from each odd line interval and mixing circuit 13B may be supplied with the timebase expanded luminance component derived from each even line interval. Alternatively, the timebase, expanded luminance components derived from the first and third line intervals may be supplied to mixing circuit 13A, and the timebase expanded luminance components derived from the second and fourth line intervals may be supplied to mixing circuit 13B.

The timebase compressed red color difference component $P_R$ derived from alternate line intervals is supplied first to mixing circuit 13A, then to mixing circuit 13B, then to mixing circuit 13A, and so on. Each mixing circuit functions to multiplex the timebase compressed color difference components supplied thereto with the timebase expanded luminance component. In a similar manner, the timebase compressed blue color difference component $P_B$ derived from alternate (or even) line intervals is supplied first to mixing circuit 13B, then to mixing circuit 13A, then to mixing circuit 13B, and so on. As a result, mixing circuit 13A produces the multiplexed signal $S_a$ shown in FIG. 3D, wherein the timebase expanded luminance component derived from alternate line intervals is time multiplexed with alternate ones of the timebase compressed red and blue color difference components $P_R$ and $P_B$. Similarly, mixing circuit 13B produces the time division multiplexed signal $S_b$ shown in FIG. 3E, wherein alternate ones of the timebase expanded luminance components are time division multiplexed with alternate ones of the timebase compressed blue color difference components $P_B$ and timebase compressed red color difference component $P_R$.

By multiplexing the timebase compressed color difference component, which has been compressed to an interval approximately equal to $\frac{1}{2}$H, with the timebase expanded luminance component, which has been expanded to an interval approximately equal to $_3^5$H, a recording interval approximately equal to twice the conventional horizontal line interval is produced. The burst signal BS produced by clock generator 1 is inserted into this recording interval, as shown in FIS. 3D and 3E, as is a horizontal synchronizing pulse $H_D$. Thus, the horizontal synchronizing pulse exhibits a repetition frequency equal to one-half the conventional repetition rate. In one embodiment, the frequency of burst signal BS is selected to be approximately 6.75 MHz which is derived by dividing a clock frequency of 74.25 MHz by 11. This clock frequency of 74.25 MHz is the sampling frequency used to digitize the original luminance component Y and the original red and blue color difference components $P_R$ and $P_B$.

FIGS. 3D and 3E represent the particular line intervals from which the timebase expanded luminance component Y and timebase compressed red and blue color difference components $P_R$ and $P_B$ are derived. As mentioned above, the time division multiplexed luminance and color difference components in channels A and B are provided in repetitive recording intervals whose duration is equal to approximately twice a conventional horizontal line interval. A horizontal synchronizing pulse and burst signal (the latter having a substantially constant amplitude over a period of five cycles of, for example, a sinusoid) are included in each recording interval.

Thus, as shown in FIG. 3D, the timebase expanded luminance component Y derived from line intervals (n+4x) and (n+4x+2) is provided in channel A with which it is multiplexed first with timebase compressed red color difference component $P_R$ derived from line interval (n+4x) followed by timebase compressed blue color difference component $P_B$ derived from line interval (n+4x+3), wherein n equal any desired line interval and x+0, 1, 2, . . . , and so on. Similarly, the channel B signal $S_b$ shown in FIG. 3E is formed of the timebase expanded luminance component Y derived from line intervals (n+4x+1) and (n+4x+3) with which it is multiplexed first with the timebase compressed blue color difference component $P_B$ derived from line interval (n+4x+1) followed by the timebase compressed red color difference component $P_R$ derived from line interval (n+4x+2). Those of ordinary skill in the art will appreciate that mixing circuits 13A and 13B may be formed of conventional logic circuitry suitably controlled by clock pulses derived from clock generator 1 to produce these separate channels $S_a$ and $S_b$ of multiplexed timebase modified luminance and color difference components as shown in FIGS. 3D and 3E. Alternatively, the mixing circuits may include a suitably programmed microprocessor to carry out this multiplexing operation.

In another embodiment, the line interval from which the timebase expanded luminance component is derived for signals $S_a$ and $S_b$ is the same line interval from which the timebase compressed color difference component multiplexed therewith is derived.

Desirably, to minimize noise and to compensate for dropout, successive recording intervals included in each channel of multiplexed signals $S_a$ and $S_b$ are formed of a timebase expanded luminance component and a timebase compressed color difference component derived from the same and then different (e.g. adjacent) line intervals. As an alternative, however, the timebase expanded luminance component and the timebase compressed color difference component in each recording interval may be derived from the same line interval. It is clear from FIGS. 3D and 3E that only alternate line intervals of the color difference components are multiplexed with the luminance component. Those line intervals of color difference components which are not multiplexed simply are discarded. Thus, one of the timebase compressed color difference components is derived from each even line interval and the other is derived from each odd line interval.

Irrespective of the particular line intervals which are multiplexed into signals $S_a$ and $S_b$ of channels A and B, it is appreciated that timebase expanding circuit 12Y and timebase compressing circuits 12R and 12B may be implemented by digital circuitry, as mentioned above. Thus, successive line intervals of the timebase expanded luminance component are provided at the outputs of timebase expanding circuit 12Y and alternate line intervals of the timebase compressed color difference components are provided at the outputs of timebase compressing circuits 12R and 12B. Mixing circuits 13A and 13B multiplex these timebase modified components to produce the multiplexed signals shown in FIGS. 3D and 3E. It is seen that the period of each recording interval is expanded relative to the conventional line interval. In the example described herein, the ratio of the expanded period of the luminance component to the compressed period of the color difference component is about 10:3. Assuming that the bandwidth of the original luminance component shown in FIG. 3A is on the order of 20 MHz, as may be the case if the luminance component is derived from an HDTV signal, the bandwidth exhibited by the timebase expanded luminance component shown in FIGS. 3D and 3E is on the order of about 12 MHz (20 MHz $\times$ 3/5 = 12 MHz). However, by timebase compressing the color difference components, the bandwidth of each such component is expanded from its original bandwidth of approximately 6 MHz (as may be the case if the color difference component is included in an HDTV signal) to 12 MHz (6 MHz $\times$ 2/1 = 12 MHz). Thus, by timebase expanding the luminance component while timebase compressing the color difference components, the resultant timebase modified components exhibit substantially equal bandwidths, both on the order of about 12 MHz.

Mixing circuits 13A and 13B also are supplied with PCM-encoded, timebase compressed left-channel and right-channel audio signals from PCM encoder 22, as mentioned above. Preferably, these PCM-encoded audio signals are inserted into the vertical blanking periods of the multiplexed channel A and channel B signals $S_a$ and $S_b$, respectively. Thus, the vertical blanking interval, which normally contains minimal information, now carries the audio information which accompanies the timebase modified video signals.

The two channels of multiplexed video (and audio) signals are frequency modulated by FM modulators 14A and 14B, amplified by amplifiers 15A and 15B and modulate the recording laser beams by optical modulators 16A and 16B. The modulated laser beams then are recorded in separate, parallel, spiral tracks on master record disc 40. Although not shown in FIG. 1, it will be appreciated that the diameter d of the recording laser beams $L_a$ and $L_b$ derived from laser source 31 is determined by the numerical aperture of the objective lens of modulators 16A and 16B, the wavelength $\lambda$ of the laser beams and other conventional characteristics, thereby establishing the width and, thus, the density of the record tracks. For example, a numerical aperture of 0.5 taken in combination with a wavelength of 780 to 830 nanometers results in a recording beam spot diameter of approximately 1.6 micrometers.

Figure 2:
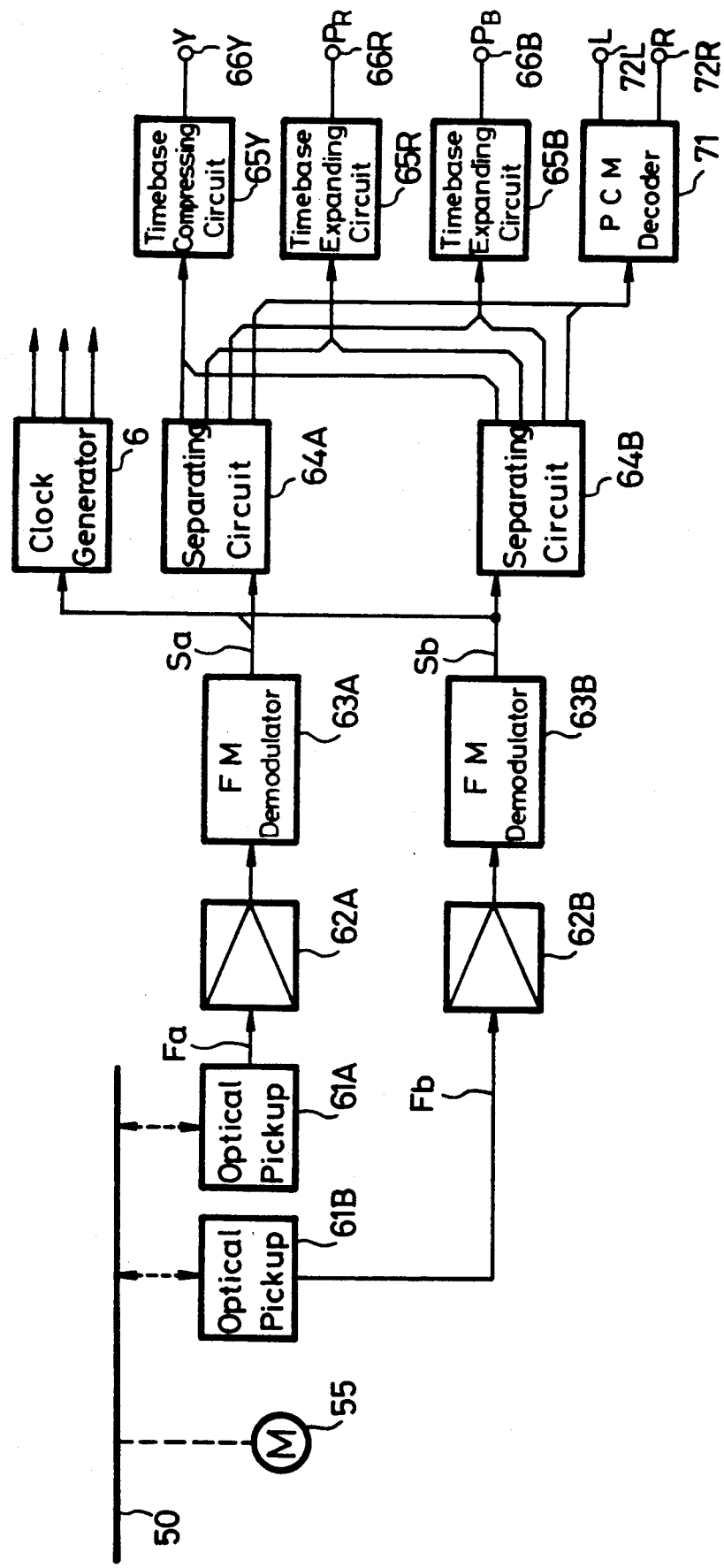
FIG. 2 is a block diagram showing one embodiment of reproducing apparatus which incorporates the present invention to reproduce the video signals which are recorded by the apparatus shown in FIG. 1.

The resultant master disc 40 having the timebase modified video components recorded in separate channels thereon, as aforesaid, then may be used to manufacture copies of optically readable video discs in conventional manner. Such video disc copies may be played back to recover the original wideband video signals (e.g. the HDTV signals) by the apparatus illustrated in FIG. 2. It will be appreciated that this playback apparatus is complementary to the recording apparatus shown in FIG. 1 and is comprised of optical pickups 61A and 61B included in channels A and B, respectively, FM demodulators 63A and 63B, demultiplexing (or separating) circuits 64A and 64B and a timebase compressing circuit 65Y and timebase expanding circuits 65R and 65B.

Optical pickups 61A and 61B are in optical communication with a video disc copy 50 (referred to hereinafter, for simplicity, simply as a video disc) which is rotatably driven by a motor 55. The optical pickups are spaced so as to reproduce signals picked up from two adjacent, parallel, spiral tracks recorded on disc 50. Although not shown in FIG. 2, it will be appreciated that the optical pickups are mounted on a suitable structure which moves radially as disc 50 rotates, thereby scanning successive tracks.

Optical pickups 61A and 61B are coupled to FM demodulators 63A and 63B via amplifiers 62A and 62B, respectively. The demodulators serve to frequency demodulate the signals $F_a$ and $F_b$ picked up by optical pickups 61A and 61B, respectively, to produce the channel A and channel B time division multiplexed signals $S_a$ and $S_b$ shown in FIGS. 3D and 3E. These demodulated signals are supplied to separating circuits 64A and 64B, respectively, and also to a clock generator 6 which functions to generate various clock signals that are synchronized with the picked up burst signal BS, horizontal synchronizing pulses $H_D$ and vertical synchronizing pulse. Such clock signals are used by the timebase compressing and expanding circuits, and other circuitry (not shown), for suitably processing the recovered signals $S_a$ and $S_b$.

Separating circuits 64A and 64B are adapted to demultiplex the frequency demodulated signals $S_a$ and $S_b$, respectively. Separating circuit 64A is coupled to timebase compressing circuit 65Y, to timebase expanding circuit 65R and to timebase expanding circuit 65B. Separating circuit 64B also is coupled to these respective circuits. It is appreciated that the demultiplexed, timebase expanded luminance component Y produced by each separating circuit is timebase compressed by timebase compressing circuit 65Y which functions to compress the period of the luminance component supplied thereto so as to recover the luminance component of original, conventional line interval duration shown in FIG. 3A. Timebase compressing circuit 65Y may be formed of one or more memory devices having a write-in rate substantially equal to the read-out rate of the memory devices comprising timebase expanding circuit 12Y (shown in FIG. 1) and having read-out rates substantially equal to the write-in rates of the memory devices included in timebase expanding circuit 12Y. Thus, the read-out rate of timebase compressing circuit 65Y is greater than the write-in rate thereof so as to compress the recovered luminance component by the factor 3/5. This timebase compression factor serves to expand the bandwidth of the recovered luminance component to its original bandwidth on the order of 20 MHz.

Timebase expanding circuit 65R is adapted to receive the demultiplexed, separated red color difference signal $P_R$ provided by separating circuits 64A and 64B. This timebase compressed red color difference component is timebase expanded in circuit 65R to recover alternate line intervals of the red color difference signal, such as the odd line intervals. Timebase expanding circuit 65R provides a timebase expansion factor of 2/1 and, thus, reduces the bandwidth of the recovered red color difference signal from 12 MHz to 6 MHz. Suitable interpolation techniques are used by timebase expanding circuit 65R, or by other circuitry coupled to output terminal 66R, to simulate those line intervals of the red color difference signal which had not been recorded in channel A or channel B. Thus, for the embodiment described wherein it is assumed that only odd line intervals of the red color difference signal are recorded, such interpolation techniques are used to simulate the non-reproduced even line intervals of the red color difference signal.

Timebase expanding circuit 65B is similar to timebase expanding circuit 65R and is supplied with the separated, demultiplexed blue color difference component $P_B$ produced by separating circuits 64A and 64B. Accordingly, only alternate line intervals of the blue color difference components $P_B$ are timebase expanded; and those non-reproduced line intervals, such as the odd line intervals of the blue color difference component, are simulated by conventional interpolation techniques. Here too, timebase expanding circuit 65B provides a timebase expansion factor of 2/1 so as to reduce the bandwidth of the blue color difference component from 12 MHz to 6 MHz.

Thus, timebase compressing circuit 65Y together with timebase expanding circuits 65R and 65B and conventional interpolation circuitry operate to produce successive, conventional horizontal line intervals of the original luminance component Y (shown in FIG. 3A), successive conventional line intervals of the red color difference component $P_R$ (shown in FIG. 3B) and successive conventional line intervals of the blue color difference component $P_B$ (shown in FIG. 3C).

Separating circuits 64A and 64B also are coupled to a PCM decoder 71 which functions to decode the left-channel and right-channel audio signals which had been inserted into the vertical blanking period of the recorded video signal. The decoded audio signals are provided at output terminals 72L and 72R from which the original left-channel and right-channel audio signals may be reproduced.

Although not described herein, it will be recognized that the various clock signals produced by clock generator 6 in response to the vertical synchronizing pulse, the horizontal synchronizing pulse $H_D$ and the burst signal BS included in the demodulated channel A and channel B signals $S_a$ and $S_b$ are supplied to timebase modifying circuits 65Y, 65R and 65B, as well as to PCM decoder 71 for use in reproducing the luminance, color difference and audio components. By synchronizing these clock signals to the reproduced signals $S_a$ and $S_b$, jitter as well as wow and flutter are removed or at least substantially minimized in the video and audio output signals produced by the reproducing apparatus shown in FIG. 2.

In operation, it is seen that separating circuits 64A and 64B recover successive line intervals of the timebase expanded luminance component Y from alternate ones of the reproduced channel A and channel B signals $S_a$ and $S_b$, shown in FIGS. 3D and 3E. The timebase compressed red color difference signal $P_R$ derived from the original line interval (n+4x) is demultiplexed from the channel A signal $S_a$ by separating circuit 64A and supplied to timebase expanding circuit 65R, while the red color difference component derived from the original (n+4x+2) line interval is demultiplexed from the channel B signal $S_b$ and supplied to timebase expanding circuit 65R by separating circuit 64B. Likewise, the blue color difference component derived from original line interval (n+4x+1) is demultiplexed from the channel B signal $S_b$ and supplied to timebase expanding circuit 65B by separating circuit 64B. In similar manner, the blue color difference component derived from original line interval (n+4x+3) is demultiplexed from the channel A signal $S_a$ and supplied to timebase expanding circuit 65B by separating circuit 64A.

While the present invention has been particularly shown and described with reference to a preferred embodiment, it will be readily appreciated by those of ordinary skill in the art that various changes and modifications may be made without departing from the spirit and scope of the invention. For example, video disc 40 may comprise an erasable disc or, alternatively, may be a so-called write once read many (WORM) disc. Likewise, video disc 50 may be an erasable disc or a WORM-type disc.

As mentioned above, another modification to the present invention may reside in the particular nature of the color difference components. In place of the aforedescribed color difference components (R-Y) and (B-Y), the color difference components may be (G-R) and (G-B) components. In this modification, the luminance component Y may be replaced by the green color signal G. It is appreciated that such modification may be used when the three primary color signals R, G and B are supplied as input signals to the recording apparatus shown in FIG. 1.

As yet another alternative, the particular line intervals from which the timebase compressed red and blue color difference components are derived for multiplexing with the timebase expanded luminance component in a respective recording interval need not be limited to the examples shown in FIGS. 3D and 3E and discussed above. For example, the timebase compressed component in the channel A signal may be comprised solely of timebase compressed, alternative line intervals of the red color difference component and the timebase compressed component in the channel B signal may be comprised solely of alternate line intervals of the blue color difference component or vice versa. The blue color difference component may be derived from the same line intervals as are used to produce the red color difference components or, as described, from those line intervals which are not used to produce the red color difference component. Furthermore, although it is desirable to alternate the line intervals from which a timebase compressed color difference component is multiplexed with the timebase expanded luminance component, such as shown in FIGS. 3D and 3E wherein one recording interval contains luminance and color difference components from the same line interval and the next recording interval contains luminance and color difference components from adjacent line intervals, this need not be an absolute requirement. Hence, such recording interval may contain a multiplexed luminance component derived from the same line interval as that from which the timebase compressed color difference component is derived.

Therefore, it is intended that the appended claims be interpreted as including the embodiment specifically described herein, those changes, modifications and alternatives which have been discussed or suggested above, as well as all other equivalents thereto.

What is claimed is:

1. A method of recording on a video disc a composite color video signal having wide bandwidth and including a luminance component and first and second color difference components, said method comprising the steps of timebase expanding said luminance component; timebase compressing each of said first and second color different components to a bandwidth substantially equal to the bandwidth of the timebase expanded luminance component; time division multiplexing the timebase expanded luminance component and the timebase compressed color difference components by multiplexing the timebase expanded luminance component of every other horizontal line interval with alternate ones of the timebase compressed first and second color difference components, respectively, to form a first multiplexed signal channel, and multiplexing the timebase expanded luminance component of the remaining horizontal line intervals with alternate ones of the timebase compressed second and first color difference components, respectively, to form a second multiplexed channel; and recording the first and second multiplexed channels in separate tracks on said video disc.

2. The method of claim 1 wherein said luminance component is timebase expanded by a factor of approximately 5/3.

3. The method of claim 1 wherein each of said first and second color difference components is timebase compressed by a factor of approximately ½.

4. The method of claim 1 wherein each step of multiplexing comprises time-extending the multiplexed timebase expanded luminance component and timebase compressed color difference component over approximately two given horizontal line intervals to form a recording interval, and inserting into each recording interval horizontal synchronizing signals having a repetition rate of one-half the given horizontal repetition rate.

5. The method of claim 4 wherein each multiplexed signal channel is formed by multiplexing the timebase expanded luminance component of alternate line intervals with one and then the other timebase compressed first and second color difference components from mutually exclusive alternate line intervals.

6. The method of claim 1 wherein the steps of multiplexing comprise multiplexing the timebase expanded luminance component of an $(n+4x)$th line interval with the timebase compressed first color difference component of said $(n+4x)$th line interval followed by multiplexing the timebase expanded luminance component of the $(n+4x+2)$th line interval with the timebase compressed second color difference component of the $(n+4x+3)$th line interval, wherein n is any line interval and $x+0, 1, 2, \ldots$, to form said first multiplexed channel; and multiplexing the timebase expanded luminance component of the $(n+4x+1)$th line interval with the timebase compressed second color difference component of said $(n+4x+1)$th line interval followed by multiplexing the timebase expanded luminance component of the $(n+4x+3)$th line interval with the timebase compressed first color difference component of said $(n+4x+2)$th line interval to form said second multiplexed channel.

7. A method of reproducing a composite color video signal from a video disc on which the color video signal is recorded in plural channels with each channel having successive recording intervals of multiplexed signals, each recording interval being twice the duration of a given horizontal line interval and successive recording intervals being comprised of the timebase expanded luminance component of alternate horizontal line intervals time multiplexed with alternate timebase compressed color difference components, respectively, the recorded luminance component being timebase expanded relative to a given timebase and the color difference components including at least first and second color difference components timebase compressed relative to said given timebase, said method comprising the steps of: reproducing said plural channels of multiplexed luminance and color difference components from said video disc; demultiplexing the timebase expanded luminance component and the timebase compressed color difference components by separating the timebase expanded luminance component and each timebase compressed color difference component from each other to derive separate timebase modified luminance and color difference components; timebase compressing the separated luminance component to return said luminance component to given timebase; and timebase expanding the separated color difference components to return said color difference components to given timebase.

8. The method of claim 7 wherein said separated luminance component is timebase compressed by a factor of approximately 3/5.

9. The method of claim 7 wherein said separated color difference components are each timebase expanded by a factor of approximately 2/1.

10. The method of claim 7 wherein a first of said recorded channels includes the multiplexed timebase expanded luminance component of a $(n+4x)$th line interval and the timebase compressed first color difference component of said (n+4x)th line interval followed by the multiplexed timebase expanded luminance component of the (n+4x+2)th line interval and the timebase compressed second color difference component of said (n+4x+3)th line interval, wherein n is any line interval and x=0, 1, 2, ...; and wherein a second of said recorded channels includes the multiplexed timebase expanded luminance component of the (n+4x+1)th line interval and the timebase compressed second color difference component of said (n+4x+1)th line interval followed by the multiplexed timebase expanded luminance component of the (n+4x+3)th line interval and the timebase compressed first color difference component of said (n+4x+2)th line interval; and said step of demultiplexing further comprises recovering successive line intervals of the timebase expanded luminance component from alternate ones of the reproduced first and second channels; recovering in succession, said (n+4x) and said (n+4x+2) line intervals of the timebase compressed first color difference component from alternate ones of the reproduced first and second channels; and recovering, in succession, said (n+4x+1) and said (n+4x+3) line intervals of the timebase compressed second color difference component from alternate ones of the reproduced first and second channels.

11. A system for recording on a video disc a composite color video signal having wide bandwidth and including a luminance component and first and second color difference components, said system comprising: timebase expanding means for expanding the timebase of said luminance component; timebase compressing means for compressing the timebase of each of said first and second color difference components to a bandwidth substantially equal to the bandwidth of the timebase expanded luminance component; first multiplexing means for multiplexing the timebase expanded luminance component of every other horizontal line interval with alternate ones of the timebase compressed first and second color difference components, respectively, to form a first multiplexed signal channel; second multiplexing means for multiplexing the timebase expanded luminance component of the remaining horizontal line intervals with alternate ones of the timebase compressed second and first color difference components, respectively, to form a separate second multiplexed signal channel; and recording means for recording the separate first and second multiplexed signal channels in separate tracks on said video disc.

12. The system of claim 11 wherein said luminance component is timebase expanded by a factor of approximately 5/3.

13. The system of claim 11 wherein said color difference components are timebase compressed by a factor of approximately ½.

14. The system of claim 11 wherein each said means comprises means for time-extending the multiplexed timebase expanded luminance component and timebase compressed color difference component over approximately two given horizontal line intervals to form a recording interval, and means for inserting into each recording interval horizontal synchronizing signals having a repetition rate of one-half the given horizontal repetition rate.

15. The system of claim 14 wherein each said multiplexing means further comprises means for multiplexing the timebase expanded luminance component of alternate lien intervals with one and then the other timebase compressed first and second color difference components from mutually exclusive alternate line intervals.

16. The system of claim 11 wherein said first multiplexing means comprises means for multiplexing the timebase expanded luminance component of an (n+4x)th line interval with the timebase compressed first color difference component of said (n+4x)th line interval followed by the timebase expanded luminance component of the (n+4x+2)th line interval with the timebase compressed second color difference component of the (n+4x+3)th line interval to form said first multiplexed signal channel, wherein n is any line interval and x+0, 1, 2, ... ; and said second multiplexing means comprises means for multiplexing the timebase expanded luminance component of the (n+4x+1)th line interval with the timebase compressed second color difference component of said (n+4x+1)th line interval followed by the timebase expanded luminance component of the (n+4x+3)th line interval with the timebase compressed first color difference component of said (n+4x+2)th line interval to form said second multiplexed signal channel.

17. The system of claim 11 wherein said composite color video signal is a high definition television signal (HDTV) with a luminance component having a bandwidth on the order of about 20 MHz and with color difference components each having a bandwidth on the order of about 6 MHz; said timebase expanding means is operable to reduce the bandwidth of the timebase expanded luminance component to about 12 MHz; and said timebase compressing means is operable to expand the bandwidth of each timebase compressed color difference component to about 12 MHz.

18. A system for reproducing a composite color video signal from a video disc on which the color video signal is recorded in plural channels with each channel having successive recording intervals of multiplexed luminance and color difference components, each recording interval being twice the duration of a given horizontal line interval and successive recording intervals being comprised of a timebase expanded luminance component of alternate horizontal line intervals time multiplexed with alternate timebase compressed color difference components, respectively, the recorded luminance component being timebase expanded relative to a given timebase and the color difference components including at least first and second color difference components timebase compressed relative to said given timebase, said system comprising: reproducing means for reproducing said plural channels of multiplexed luminance and color difference components from said video disc; demultiplexing means for demultiplexing the timebase expanded luminance component and the timebase compressed color difference components by separating the timebase expanded luminance component and each timebase compressed color difference component from each other to derive separate timebase modified luminance and color difference components; compressing means for timebase compressing the separated luminance component to return said luminance component to its given timebase; and expanding means for timebase expanding the separated color difference components to return said color difference components to their timebase.

19. The system of claim 18 wherein said compressing means timebase expands each separated color difference component by a factor of approximately 2/1.

20. The system of claim 18 wherein said expanding means timebase expands each separated color difference component by a factor of approximately 2/1.

21. The system of claim 18 wherein a first of said recorded channels includes the multiplexed timebase expanded luminance component of a (n+4x)th conventional line interval and the timebase compressed first color difference component of said (n+4x)th conventional line interval followed by the multiplexed timebase expanded luminance component of the (n+4x+2)th conventional line interval and the timebase compressed second color difference component of said (n+4x+3)th conventional line and wherein a second of said recorded channels includes the interval, wherein n is any line interval and x+0, 1, 2, . . . ; and wherein a second of said recorded channels includes the multiplexed timebase expanded luminance component of the (n+4x+1)th conventional line interval and the timebase compressed second color difference component of said (n+4x+1)th conventional line interval followed by the multiplexed timebase expanded luminance component of the (n+4x+3)th conventional line interval and the timebase compressed first color difference component of said (n+4x+2)th conventional line interval; and said demultiplexing means comprises means for recovering successive line intervals of the timebase expanded luminance component from alternate ones of the reproduced first and second channels; means for recovering, in succession, said (n+4x) and said (n+4x+2) line intervals of the timebase compressed first color difference component from alternate ones of the reproduced first and second channels; and means for recovering, in succession, said (n+4x+1) and said (n+4x+3) line intervals of the t compressed second color difference component from alternate ones of the reproduced first and second channels.

22. The system of claim 18 wherein said plural channels are recorded in first and second tracks, respectively; and said reproducing means comprises first and second transducer means for reproducing said plural channels concurrently from said first and second tracks.

23. The system of claim 21 wherein said video disc is an optical video disc and each transducer means comprises optical pick-up means.

24. The system of claim 22 wherein the composite color video signal on the video disc is a high definition television signal (HDTV), the timebase expanded bandwidth of the recorded luminance component is on the order of about 12 MHz, and the timebase compressed bandwidth of each recorded color difference component is on the order of about 12 MHz.

* * * * *